(12) United States Patent
Motohashi

(10) Patent No.: US 7,336,579 B2
(45) Date of Patent: Feb. 26, 2008

(54) INFORMATION STORAGE APPARATUS THAT WRITES DATA IN UNRECORDED REGIONS OF A RECORDING MEDIUM

(75) Inventor: Tsutomu Motohashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 797 days.

(21) Appl. No.: 10/277,053

(22) Filed: Oct. 22, 2002

(65) Prior Publication Data

US 2003/0095484 A1 May 22, 2003

(30) Foreign Application Priority Data

Nov. 20, 2001 (JP) ............................. 2001-355256
May 31, 2002 (JP) ............................. 2002-160342

(51) Int. Cl.
*G11B 7/00* (2006.01)
(52) U.S. Cl. ................................. 369/53.24; 369/53.15
(58) Field of Classification Search ...................... None
See application file for complete search history.

(56) References Cited

U.S. PATENT DOCUMENTS

| 5,623,470 | A | * | 4/1997 | Asthana et al. ........... 369/47.49 |
| 5,706,262 | A | * | 1/1998 | Yokota et al. ............ 369/30.09 |
| 5,724,323 | A |   | 3/1998 | Mamiya et al. |
| 5,815,475 | A | * | 9/1998 | Igarashi et al. ........... 369/47.13 |
| 5,978,336 | A | * | 11/1999 | Mine et al. ............... 369/47.14 |
| 6,151,281 | A |   | 11/2000 | Van Der Enden et al. |
| 6,189,118 | B1 | * | 2/2001 | Sasaki et al. ................ 714/710 |
| 6,272,085 | B1 | * | 8/2001 | Maeda ..................... 369/53.17 |
| 6,609,175 | B1 | * | 8/2003 | Ando et al. .................. 711/112 |
| 2002/0046319 | A1 |   | 4/2002 | Motohashi |

FOREIGN PATENT DOCUMENTS

| EP | 0 552 986 A2 | 7/1993 |
| EP | 0 866 456 A1 | 9/1998 |
| EP | 0 908 882 A2 | 4/1999 |
| EP | 1 020 860 A2 | 7/2000 |
| EP | 1 148 497 A2 | 10/2001 |
| JP | 5-114247 | 5/1993 |

\* cited by examiner

*Primary Examiner*—William Korzuch
*Assistant Examiner*—Joseph R. Haley
(74) *Attorney, Agent, or Firm*—Dickstein Shapiro LLP

(57) ABSTRACT

An information storage apparatus that stores data in a recording medium, retrieves control information of the recording medium, identifies remaining unrecorded regions in the recording medium based on the control information, stores data only in the unrecorded regions, and updates items of the control information corresponding to the recorded regions so that the information storage apparatus can skip the recorded regions when it stores data in the recording medium next time. The information storage apparatus can reduce time required for certifying the recording medium.

22 Claims, 5 Drawing Sheets

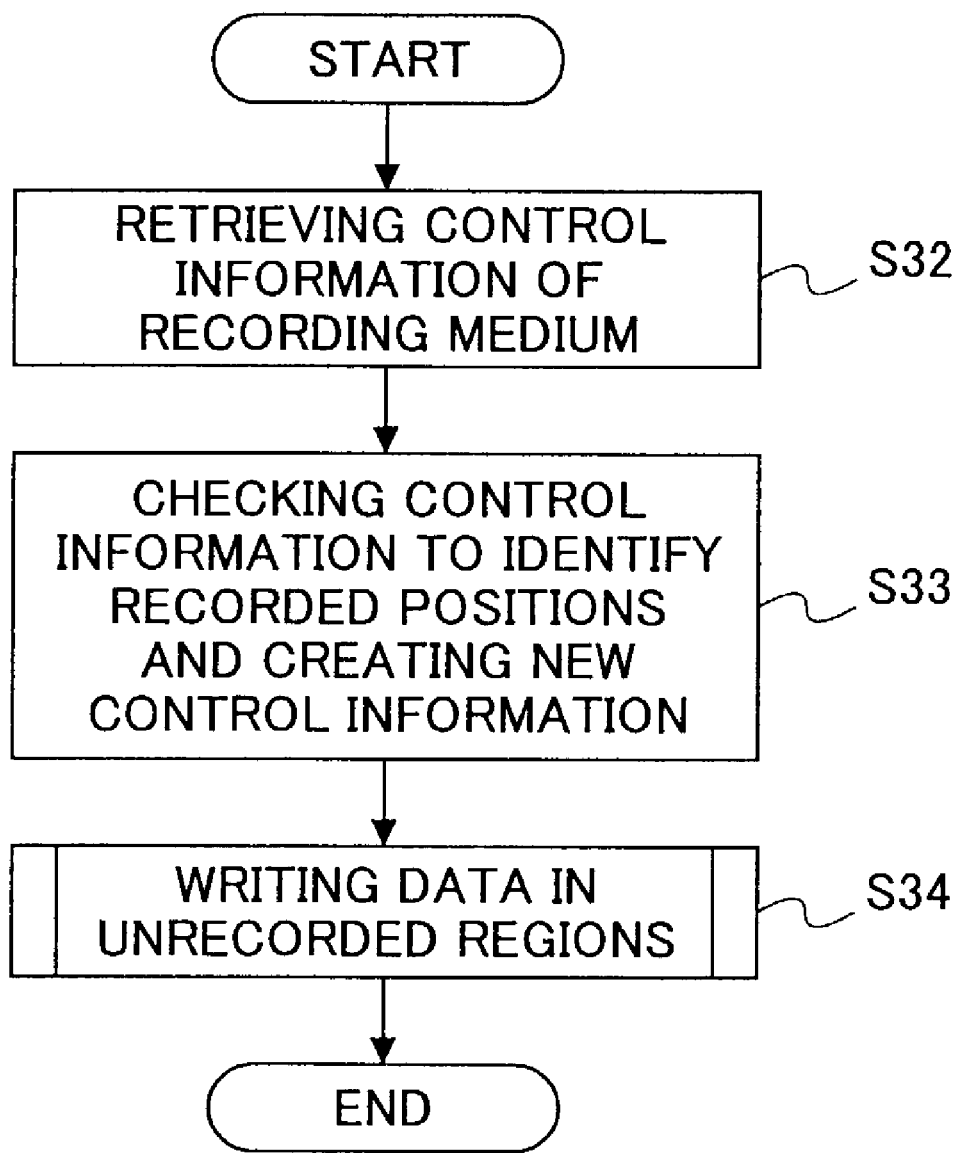

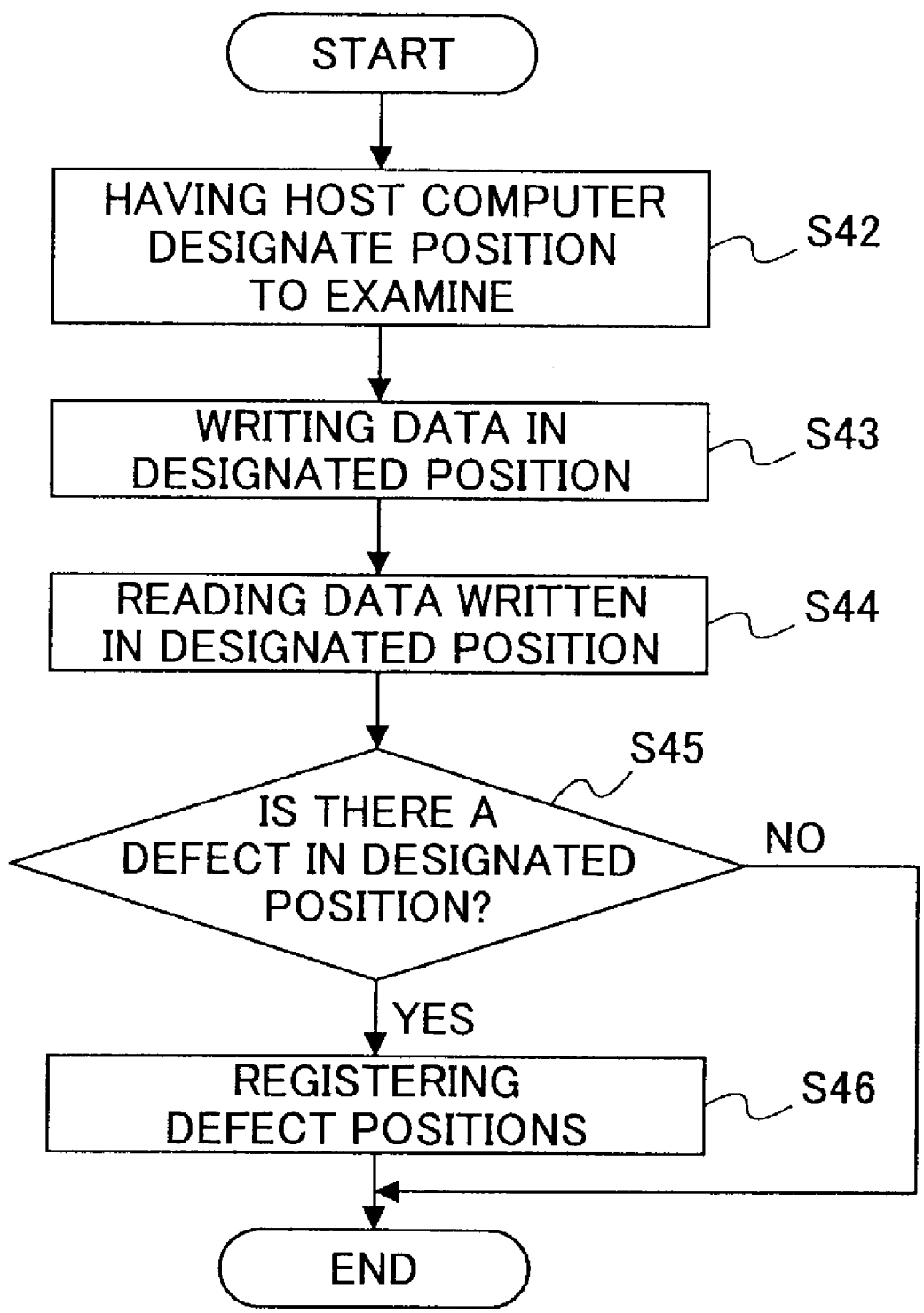

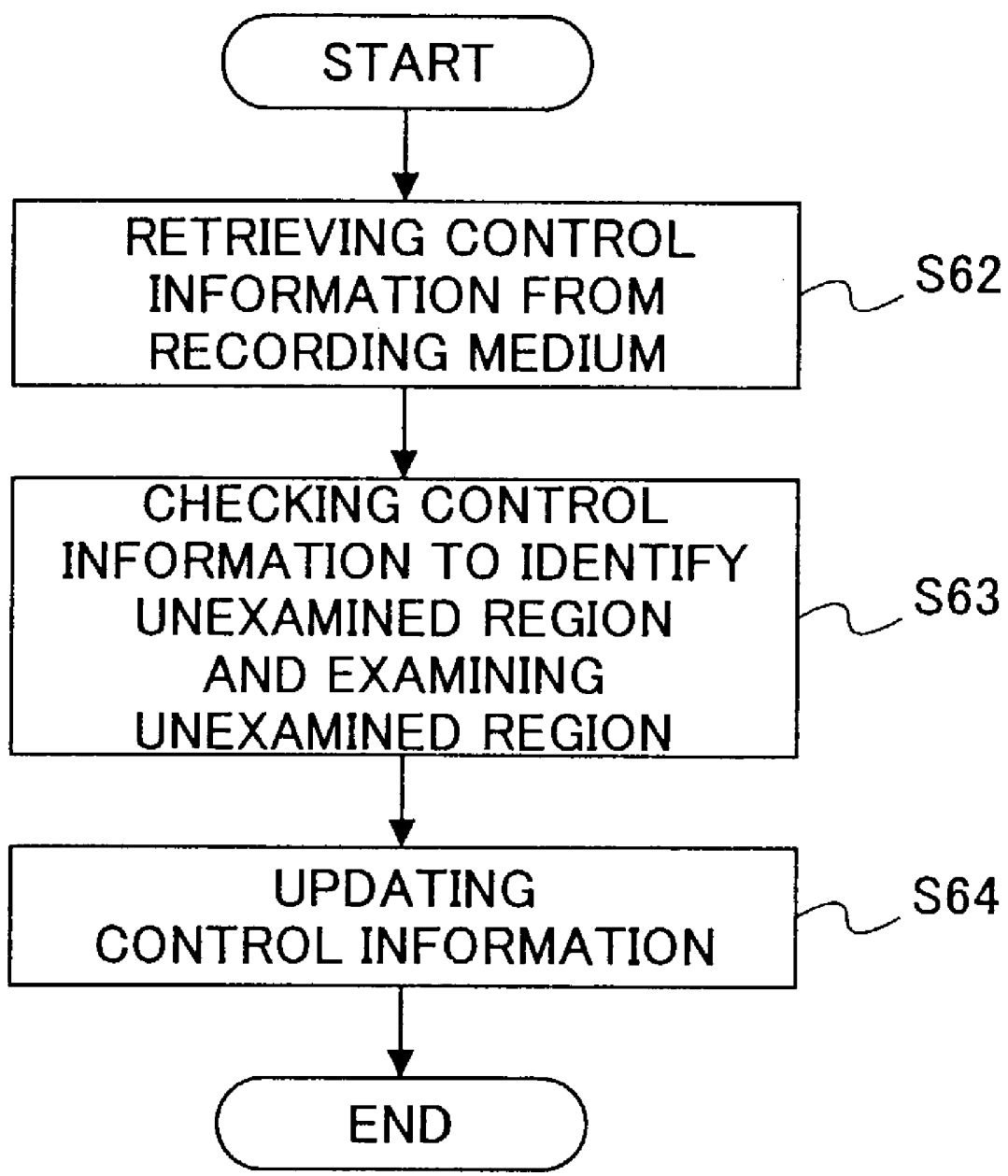

200~# INFORMATION STORAGE APPARATUS THAT WRITES DATA IN UNRECORDED REGIONS OF A RECORDING MEDIUM

BACKGROUND OF THE INVENTION

1. Field of the Invention

The present invention relates to an information storage apparatus, and more particularly, to an information storage apparatus that identifies unrecorded regions of a recording medium and selectively stores data in the unrecorded regions.

2. Description of the Related Art

In the case of rewritable recording media such as CD-RW (Compact Disk-ReWritable), DVD-RAM (Digital Versatile Disk-RAM), DVD–RW (Digital Versatile Disk-ReWritable), DVD+RW (Digital Versatile Disk+ReWritable), an information storage apparatus conventionally certifies a region of the recording medium by storing dummy data in the region before the information storage apparatus stores user data in the region of the recording medium in random access mode.

The information storage apparatus writes dummy data in the region of the recording medium and reads the dummy data in order to check whether the region of the recording medium contains any defects. If the region of the recording medium is defective (contains any defect) but the positions of the defects in the recording medium are known in advance, the information storage apparatus can avoid writing user data on the defective positions so that the user data are not lost.

The recording medium also needs to be certified to fill unrecorded regions of the recording medium with dummy data so that a read only apparatus such as a CD drive and a DVD drive can read the recording medium. A rewritable apparatus can read data even if the data are written in the recording medium at intervals, but the read only apparatus such as a conventional CD drive and a conventional DVD drive may fail to read data written in the recording medium at intervals because the unrecorded regions cause the read only apparatus to malfunction.

Additionally, if the quantity of data written in the recorded region is less than a predetermined size, the read only apparatus may erroneously access the unrecorded region and fail to normally operate. Accordingly, the rewritable apparatus needs to certify the recording medium so as to avoid the above problems.

Japanese Laid-open Patent Application No. 5-114247 discloses a magneto-optical disk drive that can efficiently use information about defects detected during its manufacturing process by a disk certifying system and, if user data are relocated during a writing operation, smoothly check the reason of the relocation.

According to the specification of the above patent application, the magneto-optical disk drive includes a means for reading the address of defective positions identified by the disk certifying system. The disk has a zone located in the edge of the disk in which the address of the defective region is to be recorded. The magneto-optical disk drive further includes a means for recording the address of the defective positions in the zone. Accordingly, the magneto-optical disk drive retrieves, while it is formatting the disk, the information of defective positions identified by the disk certifying system and records the addresses of the defective positions in the zone.

However, according to the related art of the certifying operation, if the quantity of data recorded in a disk is too small, a disk drive has to write additional data until the quantity reaches a certain quantity so as to make the disk readable by a read only apparatus. Additionally, when the disk drive writes dummy data in the unrecorded region, the disk drive needs to not only write data in the unrecorded region but also overwrite recorded data in the recorded region. A user has to wait for long until the disk drive completes certifying the disk.

In the case where there are recorded regions and unrecorded regions in a disk and/or the size of data recorded in a recorded region is equal to or greater than a certain quantity, another disk drive such as a conventional read only apparatus may not able to read the disk due to lack of compatibility.

According to the conventional formatting disclosed in Japanese Laid-open Patent Application No. 5-114247, a whole disk needs to be certified. The user has to wait for long for the disk drive to complete writing dummy data in the whole disk and reading the dummy data from the whole disk.

SUMMARY OF THE INVENTION

Accordingly, it is a general object of the present invention to provide a novel and useful information storage apparatus in which one or more of the problems described above are eliminated.

Another and more specific object of the present invention is to provide an information storage apparatus that detects an unrecorded region in a disk and writes dummy data or user data only in the unrecorded region so that the information storage apparatus can format a disk in a short period of time. The information storage apparatus does not write any data in a recorded region in the disk. In the case where there are recorded regions at intervals, the information storage apparatus fills dummy data in unrecorded regions and, if data of a predetermined size are not written in the recorded regions, writes additional dummy data in the unrecorded regions until the quantity of data recorded in the recorded regions reaches the predetermined size so that another disk drive can read the disk.

Yet another object of the present invention is to provide an information storage apparatus that performs defect processing in a specific region so as to shorten the time period required for the defect processing.

To achieve one of the above objects, an information storage apparatus, according to the present invention, that can write data in a recording medium in which data have been written at least one time, includes a retrieving unit that retrieves control information of a data recording region from said recording medium, a region determining unit that determines whether an unrecorded region exists in said recording medium based on said control information retrieved by said retrieving unit, and an updating unit that updates recorded position information in said control information retrieved by said retrieving unit, wherein said information storage apparatus, when said region determining unit determines that an unrecorded region exists in said recording medium, obtains information of unrecorded region from said retrieving unit, stores data in said unrecorded region using said information of unrecorded region, and updates said information of said unrecorded region by said updating unit.

According to the present invention, if the control information indicates that there remains an unrecorded region in the recording medium, the information storage apparatus obtains the position information of the unrecorded region, writes data only in that region, and updates the control information corresponding to the region. Accordingly, the information storage apparatus can reduce time required for certifying and can further reduce the time in the next certifying. The control information may be updated either before or after the writing of data.

In addition, the position information of the control information may also be updated not only after writing data in the entire unrecorded region but also while an unrecorded region remains. Therefore, even in situations where the user ejects the recording medium in the middle of formatting or the host computer requests to store (or read) user data, the information storage apparatus can update the control information in the recording medium. After the recording medium is inserted again or data are written or read, the operation according to the present invention can be performed based on the updated control information.

Other objects, features, and advantages of the present invention will become more apparent from the following detailed description when read in conjunction with the accompanying drawings.

BRIEF DESCRIPTION OF THE DRAWINGS

FIG. 3 is a flow chart showing the operation of an information storage apparatus according to the second embodiment of the present invention, in which the information storage apparatus prepares for the storage of information in an unrecorded region;

FIG. 4 is a flow chart showing the operation of an information storage apparatus according to the third embodiment of the present invention, in which a position in the recording medium is set for examination; and FIG. 5 is a flow chart showing the operation of the fourth embodiment of the present invention, in which the recording medium is examined.

DETAILED DESCRIPTION OF THE PREFERRED EMBODIMENTS

The preferred embodiments of the present invention will be described in detail below by reference to the drawings. Components, types, combinations, shapes, and arrangements described in the following embodiments are merely examples for explanation and are not intended to limit the scope of the present invention unless otherwise explicitly stated so.

Figure 1:
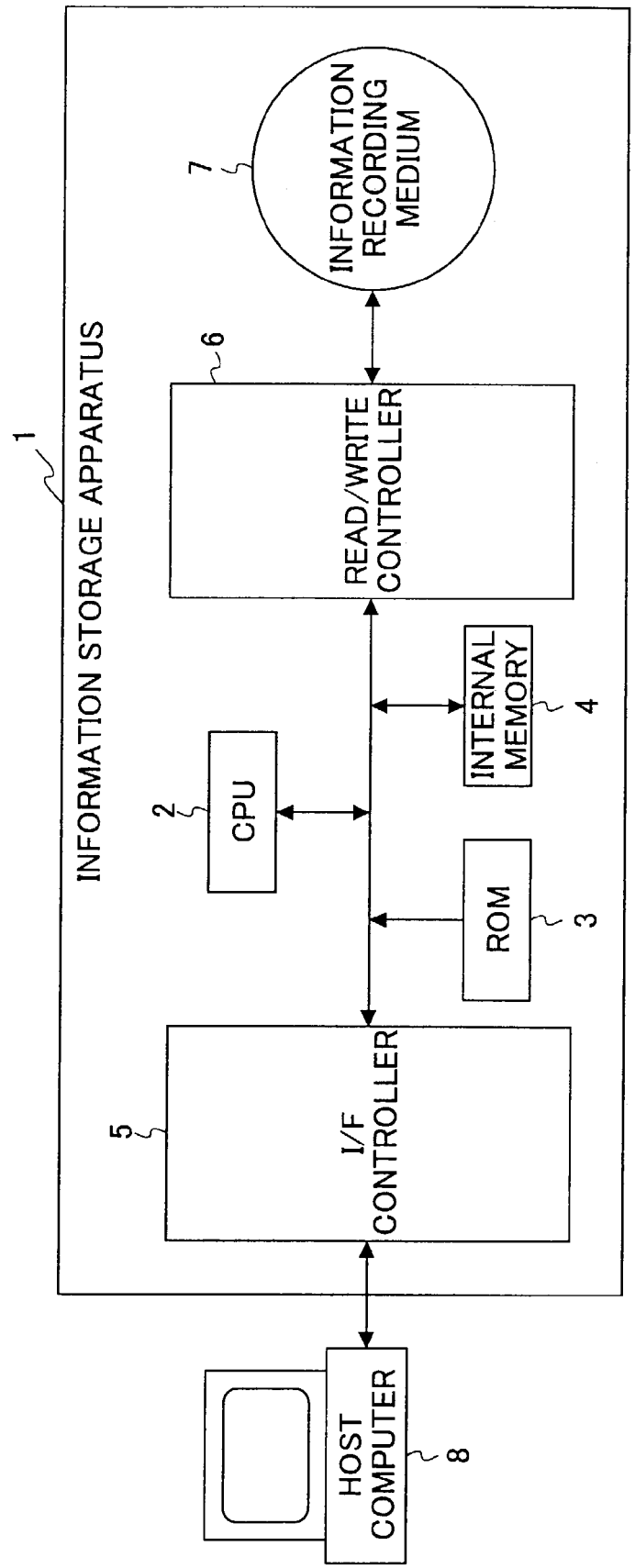
FIG. 1 is a block diagram showing an information storage apparatus according to an embodiment of the present invention.

FIG. 1 is a block diagram showing an information storage apparatus according to an embodiment of the present invention. The information storage apparatus 1 is configured by the following: a CPU 2 that runs a control program and controls the other components of the information storage apparatus 1, a ROM 3 that stores the control program, an internal memory 4 that temporarily stores data and control information of the recording medium, an interface controller 5, a read/write controller 6 that reads and writes data on a recording medium 7, and a host computer 8 such as a personal computer that controls the information storage apparatus 1. The ROM 3 may be a mask ROM, a flash memory, or a CD-ROM, and so forth.

Figure 2:
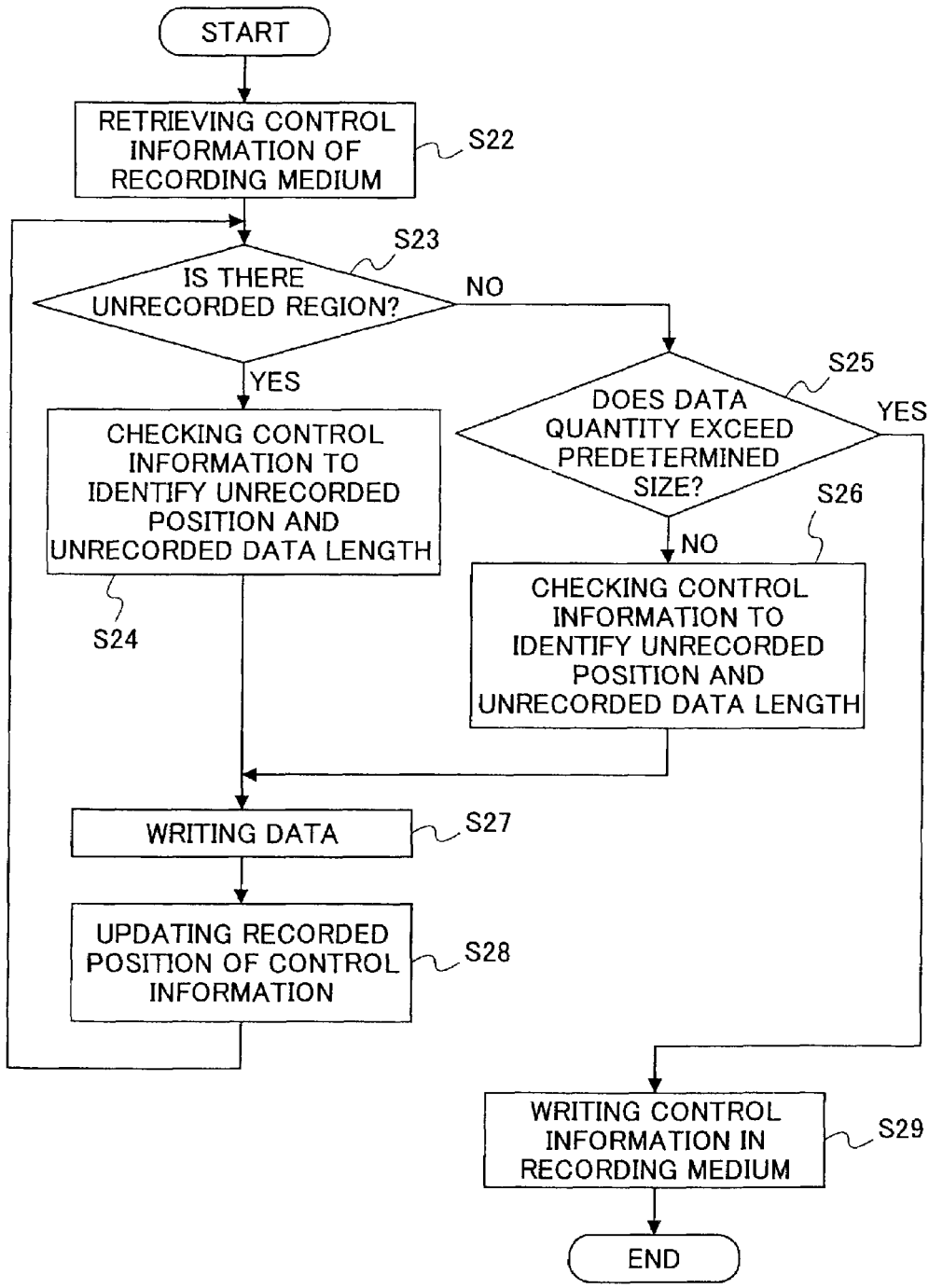
FIG. 2 is a flow chart showing the operation of an information storage apparatus according to the first embodiment of the present invention, in which information is stored in an unrecorded region of a recording medium.

The operations showed in flow charts to be described below are performed by the CPU 2, or the other components in response to an instruction given by the CPU 2, in compliance with the control program stored in the ROM 3. FIG. 2 is a flow chart showing the writing operation in an unrecorded region of the information storage apparatus 1 according to the first embodiment. The writing operation in the unrecorded region will be described by reference to FIG. 2 as well as FIG. 1.

This operation is applicable to the following three cases. In the first case, the recorded region (data zone) contains one or more unrecorded regions. In the second case, the range where continuous data have been recorded (in the case where the continuous data are recorded from the innermost side of the recording medium, for example, the range between the innermost position to the most outer position up to which the continuous data lasts) does not contain an unrecorded region, but the quantity of continuous data recorded in the range does not reach a predetermined size. In the third case, the range where continuous data have been recorded (in the case where the continuous data are recorded from the innermost side of the recording medium, for example, the range between the innermost position to the most outer position up to which the continuous data lasts) does not contain an unrecorded region, and the quantity of continuous data recorded in the range exceeds a predetermined size.

The first case will be described in detail first. When user data are recorded in a rewritable disk in random access mode, the user data are not necessarily recorded continuously and may be recorded at intervals. The information storage apparatus 1 retrieves control information indicating the state of the recording region of the recording medium 7, from the recording medium 7 in which data have been recorded at least once, so as to control the recording region, and stores the retrieved control information in the internal memory 4 (step S22). The information storage apparatus 1 determines whether there are one or more unrecorded regions in the recording medium 7 based on the control information stored in the internal memory 4 (step S23). If the internal storage apparatus 1 determines that there is an unrecorded region (Yes branch of step S23), the information storage apparatus 1 obtains the unrecorded position and the unrecorded data length of the unrecorded region from the control information (step S24). The information storage apparatus 1 stores data from the unrecorded position until the unrecorded data length is exhausted (step S27). The information storage apparatus 1 updates the control information by registering that the unrecorded region has changed to a recorded region (step S28) and then, returns to step S23. Step S28 may precede step S27. In situations where, for example, the power supplied to the information storage apparatus 1 is accidentally cut while the information storage apparatus 1 is recording data in the unrecorded region of the recording medium 7, however, the information storage apparatus 1 can overwrite, if step S27 precedes step S28, data in the unrecorded region. This is an advantage of performing steps S27 and S28 in this order.

Accordingly, when formatting a disk that has been formatted once in the past, for example, the information storage apparatus 1 does not initialize the control information and omits formatting a region in which any data (whichever dummy data or user, data) have been recorded. The information storage apparatus 1 needs to format (and certify) only a region in which no data have been recorded, which reduces time required for the formatting.

In the case where data (user data or dummy data) are recorded discretely in a certain range (for example, when the data are recorded from the innermost side of the recording medium 7, the range between the innermost position and the most outer position up to which the data is recorded), the information storage apparatus 1 needs to fill data only in a region where no data have been recorded. The information storage apparatus 1 can greatly reduce time required for writing data since it does not need to record data again in the recorded region.

The information storage apparatus 1 can perform the writing operation in a manner so that the recording medium 7 can be read by another disk drive. In addition, if data are discretely recorded in the recording medium 7 (the case where the recorded region contains unrecorded regions), the information storage apparatus 1 may initialize (write dummy data) only in the unrecorded region of the disk.

The second case will be explained in detail. In the second case, the recorded range is filled with data continuously recorded and has no unrecorded region, but the quantity of data does not reach a predetermined size. The recorded range means, if the data are recorded from the innermost data position of the disk, for example, the range between the innermost data position to the most outer data position in which the data are recorded.

The information storage apparatus 1 determines that there is no unrecorded region in the range (No branch of step S23), and further determines whether the quantity of the recorded data at least reaches a predetermined size (step S25). If the information storage apparatus 1 determines that the quantity of the recorded data (continuous data) does not reach the predetermined size (No branch of step S25), the information storage apparatus 1 obtains the last position of the continuous data (the address of the top position of the unrecorded region) and the quantity of insufficient data from the control information stored in the internal memory 4 again (step S26). The information storage apparatus 1 proceeds to step S27 and writes data from the top position of the unrecorded region up to the predetermined size. Of course, the total quantity of data may exceed the predetermined size. The newly recorded region is registered in the control information as a recorded region (step S28). The information storage apparatus 1 returns to step S23.

The advantage of performing steps S27 and S28 in this order is that, if the power supplied to the information storage apparatus 1 is accidentally cut while data are recorded in an unrecorded region, for example, the information storage apparatus 1 can write the same data in the unrecorded region again since the control information is not updated. Step S28, however, may precede step S27.

A description of the third case will be given below. In the third case, the recorded range (for example, in situations where data are recorded form the innermost data position in the data zone, the range between the innermost data position and the most outer data position in which the data are recorded) contains no unrecorded region, and the quantity of data recorded in the recorded range exceeds the predetermined size.

If the information storage apparatus 1 determines that the recorded range contains no unrecorded region (No branch of step S23) and that the quantity of data recorded in the recorded range exceeds the predetermined size (Yes branch of step S25), the information storage apparatus 1 writes the control information in the recording medium 7 (step S29), and then, completes the writing operation.

The control information of a DVD+RW disk, for example, indicated in the above flow chart will be described below. A DVD+RW disk has a table indicating recorded data positions in compliance with FDCB (Formatting Descriptor Control Block) recorded therein. The table holds information such as the last recorded address, the last certified address, and a bit map.

The address at which data are recorded lastly is stored in the last recorded address. The address of which defect has been checked lastly is stored in the last certified address. The bit map indicates whether each minimum recording unit has been recorded or still remains unrecorded by one bit. Because the last recorded address is the address at which data are lastly recorded, there are unrecorded regions before the last recorded address. The positions of the unrecorded regions are available from the bit map.

As described above, a conventional disk drive stores data in a recording region of a rewritable disk such as a DVD+RW in random access mode, the disk drive certifies the recording region in compliance with the FDCB (Formatting Descriptor Control Block) so as to check whether there is any defect in the recording region. However, the conventional certifying method requires, if data recorded in the recording medium are insufficient, writing at least data of the predetermined size. If the unrecorded region needs to be filled, the disk drive has to write data from the beginning, and the user has to wait until the disk drive completes the writing operation.

The information storage apparatus according to the present invention obtains addresses of unrecorded regions from the control information and stores data in the unrecorded regions indicated by the addresses so as to reduce time required for formatting. Because the information storage apparatus updates the control information corresponding to the regions in which data have just been recorded, the information storage apparatus can further reduce time required for the next formatting operation. After formatting a region, the information storage apparatus can overwrite user data in the region of the recording medium even if other user data have been recorded in the region.

In the case where there is no unrecorded region, and the total quantity of data recorded in the recording medium does not reach a predetermined size, the information storage apparatus obtains the top address from which the writing operation is to be started and the size of insufficient data, writes data until the total quantity of data stored in the recording medium reaches the predetermined size, and additionally registers the address of the newly recorded region in the control information so that the information storage apparatus can reduce time required for formatting the recording medium and make the recording medium readable by other apparatuses such as a read only apparatus (player).

FIG. 3 is a flow chart showing the initialization operation of an information storage apparatus according to the second embodiment of the present invention. The initialization operation will be described by reference to FIG. 3 as well as FIGS. 1 and 2. Initialization is an operation in which the information storage apparatus writes data in a region other than the recorded regions where data have been recorded. Accordingly, as a preceding step, the last recorded position contained in the control information needs to be managed separately.

The information storage apparatus 1 retrieves the control information from the recording medium 7 and stores it in the internal memory 4 in order to search the last recorded position (step S32). The information storage apparatus 1 obtains only recorded positions from the stored control information and creates new control information indicating the recorded positions in the internal memory 4 (step S33).

The information storage apparatus searches regions other than the recorded positions, which are regarded as unrecorded positions, based on the new control information and performs the writing of data in the unrecorded positions (steps S23, S24, S27, and S28) showed in FIG. 2 (step S34). The operation of step S34 is not described in detail because it is the same as that of steps S23, S24, S27, and S28 described in detail by reference to FIG. 2.

The operation according to the second embodiment may be performed when the operation according to the first embodiment is being performed, before or after the operation according to the first embodiment is performed.

If the unrecorded regions are to be searched, it consumes a lot of time to search only the recorded regions from the control information whenever the information storage-apparatus searches the unrecorded regions. To eliminate this problem, the information storage apparatus 1 may store the recorded regions in another memory area and look it up only if necessary (look up method). The information storage apparatus 1 can soon determine, when initializing the recording medium 7, which region is unrecorded by reference to the look up information in this manner. Accordingly, the time required for the writing operation is reduced.

FIG. 4 is a flow chart showing an operation in which the information storage-apparatus 1 according to the third embodiment of the present invention sets a position where it examines defects. In the certifying operation, the information storage apparatus 1 writes data in the entire region and reads the written data in order to detect any defects. The information storage apparatus 1 according to the present invention can format the recording medium 7 at high speed, but it cannot detect defects since it does not actually write data in the recording medium 7. Accordingly, the information storage apparatus 1 has a host computer designate a position in which the information storage apparatus 1 examines defects so that the information storage apparatus 1 examines defects only in the designated position. Moreover, the information storage apparatus 1 can be configured to determine the position by itself without having the host computer designate the position.

The information storage apparatus 1 receives the information of the designated position from the computer 8 through the interface controller 5. (step S42). Following step S42, the information storage apparatus 1 writes data in the position designated through the read/write controller 6 (step S43). Following step S43, the information storage apparatus 1 reads the data written in the recording medium through the read/write controller 6 (step S44), checks whether there is a defect in the designated position (step S45), and, if a defect is found, registers the position of the defect in the control information of the recording medium 7 (step S46). If no defect is found in step S45, then the information storage apparatus 1 finishes the process.

There are two methods of handling defects in the recording medium 7. According to one method, when the information storage apparatus 1 certifies the recording medium 7, the information storage apparatus 1 writes only the information of defect positions in the control information of the recording medium. When writing data in the recording medium 7, the information storage apparatus 1 avoids writing data in the defect positions. The information of defect positions may be stored in the recording medium 7 when it is manufactured. According to another method, the information storage apparatus 1 allocates memory area in the recording medium 7 to list the defect positions and registers the information of the alternative memory positions as well as the defect positions so that the information storage apparatus 7, when data are to be written in the defect positions, can write data in the alternative memory area. The information storage apparatus 1 writes data in the alternative memory positions as if there is no defect position. One can choose whichever method that fits the purpose and application of the information storage apparatus 1.

A simple but certain method of determining whether a position of the recording medium 7 is defective is to check whether data having a predetermined pattern written in the position can be read accurately. If the data written in the position cannot be accurately retrieved, the position is registered in the control information of the recording medium 7 as a defect position. By the way, the operation of the third embodiment may be performed during, before, or after the operation of the first embodiment or during, before, or after the operation of the second embodiment.

FIG. 5 is a flow chart showing the operation of the fourth embodiment of the present invention. The information of the defect positions needs to be stored in a memory area different from the other control information. Once the information of the defect positions is stored, the information storage apparatus 1 can reduce time required for examining defects since it does not need to examine memory areas other than the defect positions.

The information storage apparatus 1 first retrieves the information of the defect positions regarding the memory area that has been certified and stores the information of the defect positions in the internal memory 4 (step S62). The information storage apparatus 1 identifies the memory area that has not been certified yet, writes data in the uncertified memory area through the read/write controller 6, and reads the data to check whether there is a defect (step S63). The information storage apparatus 1 registers the memory area that has already been certified (step S64).

In this manner, the information storage apparatus 1 records defective areas in the recording medium 7 individually and when examining the recording medium 7, examines memory areas other than the recorded defective areas. Accordingly, the information storage apparatus 1 can expedite the examination of the recording medium 7, and examine all the memory area of the recording medium 7 without omission. The operation of the fourth embodiment may be performed during, before, or after the operation of the first embodiment. Likewise, it may be performed during, before, or after the operation of the second embodiment, or during, before, or after the operation of the third embodiment.

As described above, according to the present invention, the recording medium 7 such as a DVD+RW disk holds the control information described in connection with the first embodiment. When the recording medium 7 is formatted, the last recorded address indicates the highest address where data can be written and the bit map in compliance with FDCB (Formatting Descriptor Control Block) indicates that all the area is recorded.

In such condition, in the case where a formatted disk is formatted once again, a conventional disk drive initializes this control information and, as a result, the last recorded address indicates the top of the user data region and the entire bit map is set as unrecorded. The conventional disk drive accordingly writes data in the entire region of the recording medium 7. The information storage apparatus 1 according to the present invention, upon re-formatting, uses the control information as is without initializing (deleting) it. Accordingly, because the information storage apparatus 1 does not write data in the memory area registered in the bit map as recorded, it can reduce time required for formatting the recording medium 7. Additionally, the fact that the bit map indicates the entire memory area being recorded means that there is no unrecorded region on the recording medium 7, and the recording medium 7 can be read by a read only apparatus.

The above information storage apparatus 1 expedites the formatting, however, it cannot examine the recording medium 7 as it does not actually write data. Especially, since defects may increase in number due to degrading and damage of the recording medium 7, the information storage apparatus 1 has the host computer 8 designate a specific region that is to be examined so that the time required for the examination is reduced. In addition, the information storage apparatus 1 can eliminate the omission of examination by managing the information as the other control information.

The information storage apparatus 1 is operated by computer programs running on the CPU 2 with an operating system (OS). In the above embodiments, the computer programs are stored in the ROM 3. In another embodiment, the computer programs may be stored in a memory medium such as a flexible disk, CD-ROM, and so forth, that is readable by the CPU 2. In this case, the information storage apparatus 1 becomes ready to operate by installing the memory medium therein. If the memory medium is portable, the computer program can be performed by a computer having higher performance located at a different place.

In the above embodiments, the CPU 2, the ROM 3, the internal memory 4, the interface controller 5, and the read/write controller 6.are provided in the information storage apparatus 1 separately as individual components. In another embodiment, those components may constitute a unit, which makes the manufacturing of the apparatus easy.

All the operations described above may be performed in response to reception of a request from the host computer 8, or may be performed even if the host computer 8 is not requesting the operations. In the former case, the information storage apparatus 1 can perform the operations when the host computer determines that it is appropriate to do so, accordingly, the information storage apparatus 1 can avoid consuming power, for example, while it is operated by a battery. When being operated by a battery, the information storage apparatus 1 may perform all the operation described in the above embodiments.

On the other hand, in the latter case, the information storage apparatus 1 can perform all the above operations while it is not operating at all, so that the information storage apparatus 1 can further reduce time required for the formatting or the examination.

In summary, in an aspect of the present invention, an information storage apparatus that can write data in a recording medium in which data have been written at least one time is characterized in that it includes the following: a retrieving unit that retrieves control information of a data recording region from the recording medium, a region determining unit that determines whether an unrecorded region exists in the recording medium based on the control information retrieved by the retrieving unit, and an updating unit that updates a recorded position information in the control information retrieved by the retrieving unit, wherein the information storage apparatus, when the region determining unit determines that an unrecorded region exists in the recording medium, obtains information of the unrecorded region from the retrieving unit, stores data in the unrecorded region using the information of unrecorded region, and updates the information of the unrecorded region by the updating unit.

An information storage apparatus certifies the recording medium such as a DVD+RW disk in order to determine whether the recording medium contains any defects and if any, where the defects are. The certifying operation is performed by writing data in the recording medium and reading the data from the recording medium before writing user data. Another purpose of certifying is to write data in unrecorded regions so that even a read only apparatus such as a CD player and a DVD player can read the recording medium. A user needs to wait until the information storage apparatus completes the certifying of the recording medium.

The information storage apparatus according to the present invention uses the control information indicating the positions of recorded regions, stored in the recording medium, without deleting it. Accordingly, the information storage apparatus can write data only in unrecorded regions even if they are located separately to reduce time required for the certifying.

In the description, a "recorded region" means a region of the recording medium where either dummy data or user data have been written (recorded) and, when reading the region, the information storage apparatus can detect a signal from the region. An "unrecorded region" means a region of the recording medium where neither dummy data nor user data have been recorded and the information storage apparatus cannot detect a signal. A "region" means a range between a lower address and a higher address in the recording medium. "Position information" of a region means the higher address of the region. A "recorded range" means a portion in the data recording area of the recording medium between the top (lowest address) and the highest address at which data have been recorded.

According to the present invention, if the control information indicates that there remains an unrecorded region in the recording medium, the information storage apparatus obtains the position information of the unrecorded region, writes data only in that region, and updates the control information corresponding to the region. Accordingly, the information storage apparatus can reduce time required for certifying and can further reduce the time in the next certifying. The control information may be updated either before or after the writing of data.

In addition, the position information of the control information may also be updated not only after writing data in the entire unrecorded region but also while an unrecorded region remains. Therefore, even in situations where the user ejects the recording medium in the middle of formatting or the host computer requests to store (or read) user data, the information storage apparatus can update the control information in the recording medium. After the recording medium is inserted again or data are written or read, the operation according to the present invention can be performed based on the updated control information.

In another aspect of the present invention, the information storage apparatus as described above, is characterized in that, the information storage apparatus, in the case where the region determining unit determines that an unrecorded region exists in the recording medium when the information storage apparatus initializes the recording medium, obtains the information of unrecorded region from the retrieving unit, stores dummy data in the unrecorded region using the information of unrecorded region, and updates the information of the unrecorded region by the updating unit.

Accordingly, when the information storage apparatus initializes a disk, that is, formats (including certifying) the disk again, the information storage apparatus refers to the control information (recorded position information) without deleting the control information. The information storage apparatus does not certify recorded regions in which either user data or dummy data are already written but certifies only unrecorded regions in which no data have been written. Therefore, the information storage apparatus can reduce time required for certifying in a great extent.

In yet another aspect of the present invention, the information storage apparatus is characterized in that the information storage apparatus, when the region determining unit determines that an unrecorded region exists in a range from the top position of a data recording region, in which data have been recorded, obtains information of the unrecorded region, stores data in the unrecorded region using the information of the unrecorded region, and updates the information of the unrecorded region by the updating unit.

If data are recorded at intervals in a recorded range, that is, there still remains at least one unrecorded region in the recorded range, the read only apparatus such as a CD player and a DVD player cannot reproduce data written in the disk. Accordingly, in the case of recorded range in which there still remains one or more unrecorded region, the information storage apparatus writes data (user data or dummy data) in the one or more unrecorded regions in the recorded. range (certifying operation of one kind). The disk becomes readable by the read only apparatus. In situations where data (user data or dummy data) are recorded discretely in the recorded range (for example, if the writing operation has been started with the innermost side of the disk, the recorded range is the area between the innermost position and the most outer radial position.), the information storage apparatus needs to fill only the unrecorded region with data. The time required for writing the data can be greatly reduced compared with the case where it is necessary to write data even in the recorded regions.

In yet another aspect of the present invention, the information storage apparatus is further characterized by a size determining unit that determines whether quantity of data recorded in the recording medium is equal to or more than a predetermined size, wherein the information storage apparatus, when the region determining unit determines that no unrecorded region exists in the recording medium and the size determining unit determines that the quantity of data recorded in the recording medium is less than the predetermined size, obtains information of an unrecorded region, stores data in the unrecorded region using the information of the unrecorded region until the quantity of data recorded in the recording medium reach the predetermined size, and updates the information of the unrecorded region by the updating unit.

In the case of a rewritable disk, if data are not recorded continuously from the innermost position to the outer side (for example, data size corresponding to recording area, 30 mm or 35 mm in the radial direction from the innermost position in the case of a DVD disk) until the data size reaches a predetermined one, the rewritable disk may cause a read only apparatus (so-called player) to malfunction. The information storage apparatus checks the unrecorded position information (the highest address up to which data have been recorded) and starts writing data from the highest address until the data size stored in the recording medium reaches the predetermined data size. Accordingly, the recording medium becomes readable by the read only apparatus.

In yet another aspect of the present invention, the information storage apparatus is characterized in that the information storage apparatus, when the region determining unit determines that no unrecorded region exists in the recording medium and the size determining unit determines that the quantity of data recorded in the recording medium is equal to or more than the predetermined size, writes the control information in the recording medium.

When the information storage apparatus certifies a recording medium, it retrieves the control information of the recording medium first. That is why it is preferable to keep the control information of the recording medium always updated. If the recording medium does not have an unrecorded region in the recorded range and the quantity of data stored in the recorded range exceeds the predetermined data size, for example, the information storage apparatus can start using the recording medium as soon as the recording medium is set in the information storage apparatus.

In situations where there is no unrecorded region in the recorded range and the quantity of data stored in the recorded range exceeds the predetermined data size, the information storage apparatus does not write additional data in the recording medium but writes the control information in the recording medium so as to reduce time required for the certifying operation.

In yet another aspect of the present invention, the information storage apparatus is further characterized by a position obtaining unit that obtains information of last recorded position in the recording medium based on the control information retrieved by the retrieving unit, and a creating unit that creates new control information based on the information of last recorded position in the recording medium, wherein the information storage apparatus, when initializing the recording medium, stores data in the unrecorded region based on the new control information created by the creating unit.

The information storage apparatus, when initializing the recording medium, writes data in unrecorded regions other than the recorded regions in which data have been recorded. Accordingly, if separate control information indicating the recorded regions is created, the information storage apparatus can quickly identify unrecorded regions based on the separate control information indicating the recorded regions, which reduces time required for the writing operation.

In yet another aspect of the present invention, the information storage apparatus is further characterized by a region setting unit that sets a region in which defects are examined, a writing unit that writes data in the region set by the region setting unit, and an examining unit that examines positions of the defects by reading the data written by the writing unit, wherein the information storage unit, when the writing unit writes data in the region set by the region setting unit and the examining unit examines the positions of the defects by reading the data written by the writing unit, registers the positions of the defects in the control information.

As described above, there are two methods to manage defects in the recording medium. One is to register only the positions of the defects in the control information so that the information storage apparatus does not write user data in the defective positions. The other is to allocate another memory area to each defect so that the data to be written in the defective position are relocated to the allocated memory area. In this case, both the defective positions and allocated positions are stored in the control information.

The information storage apparatus writes data and checks whether it can read the data written at a position without failing to detect defects. If the information storage apparatus cannot read the data written at the position correctly, it registers the position as a defect.

The information storage apparatus has the external host computer to designate a region to be examined. The writing unit writes data in the designated region whether or not data have been recorded in the designated region. The examining unit reads the data written by the writing unit to detect defects. If a defect is found, its position is registered in the control information. Accordingly, time required for the detection of defects can be reduced.

An example of the designated region is a file control region used for the directory and so forth that is much more often rewritten than ordinary user data, since the region may be degraded faster than the others. Such a region needs to be examined more often than the other regions.

In yet another aspect of the present invention, the information storage apparatus is further characterized by a recording unit that records data in an examined region, wherein the information storage apparatus, when examining the defects in the recording medium, examines defects in the data recording region other than the region examined by the examining unit.

Once a region has been examined upon the certifying, it is not necessary to certify the region again. Therefore, when the information storage apparatus examines a region, it registers the region as an examined region and, when the information storage apparatus certifies the recording medium again, it does not examine the registered region again. The information storage apparatus registers the examined region in a memory area separate from the information of recorded regions. Accordingly, the information storage apparatus can reduce time required for certifying and avoids an omission in the certifying.

In an aspect of the present invention, a computer program that causes a CPU of an information storage apparatus to retrieve control information of a data recording region from the recording medium, determine whether an unrecorded region exists in the recording medium, store, when it is determined that an unrecorded region exits in the recording medium, data in the unrecorded region using the information of unrecorded region, and update the control information concurrently with storing the data by the step of storing.

Accordingly, since the CPU performs the above steps of the method of storing-information, the information storage apparatus does not need individual components that perform each step.

In another aspect of the present invention, the computer program may be stored in a computer readable storage medium.

The computer program may be stored in a storage medium such as ROM preferably in a manner that it is readable by the CPU. In the case where the storage medium is a CD-ROM and so forth, the computer program contained in the CD-ROM can be installed in an information storage apparatus located at a different place.

In yet another aspect of the present invention, an information storage unit is characterized by a CPU, an internal memory unit that stores control information of a recording medium, an interface control unit that controls interface with an external host computer, a read/write control unit that controls the writing and reading of data on the recording medium, and a computer readable recording medium containing a computer program that causes the CPU to retrieve control information of a data recording region from the recording medium, determine whether an unrecorded region exists in the recording medium, store, when it is determined that an unrecorded region exits in the recording medium, data in the unrecorded region using the information of unrecorded region, and update the control information concurrently with storing the data by the step of storing.

The information storage apparatus is configured at least by a CPU that controls the entire system, a memory medium such as a flash ROM and a RAM that stores the computer program therein, a memory medium for temporary storage of data, an interface for exchanging data and commands with the host computer, and a read and write controller that writes and reads data in/from the recording medium. Those components are desired to be as small and light as possible.

It is possible to make the information storage apparatus as small and light as possible by unitizing the indispensable components. Since the unit can perform the major function of the information storage apparatus, the structure of the information storage apparatus is simplified and the manufacturing of the information storage apparatus is made easy.

The preferred embodiments of the present invention are described above. The present invention is not limited to these embodiments, but various variations and modifications may be made without departing from the scope of the present invention.

This patent application is based on Japanese priority patent application No. 2001-355256 filed on Nov. 20, 2001, and No. 2002-160342 filed on May 31, 2002, the entire contents of both of which are hereby incorporated by reference.

What is claimed is:

1. An information storage apparatus, comprising:
   a data writing unit that writes data on a recording medium including a reproduction data region, the reproduction data region including one or more recorded regions and one or more unrecorded regions;
   a retrieving unit that retrieves, from said recording medium, control information indicating the one or more recorded regions in which said data writing unit has written data or indicating the one or more unrecorded regions in which said data writing unit has not written data yet;
   a region determining unit that determines whether the one or more unrecorded regions exist in said recording medium based on said control information retrieved by said retrieving unit;
   an updating unit that updates the control information; and
   a size determining unit that determines whether quantity of data recorded in said recording medium is equal to or more than a predetermined size less than said reproduction data region;
   wherein, when said region determining unit determines that the one or more unrecorded regions exist in said recording medium, said data writing unit certifies or formats the recording medium by storing data to the one or more unrecorded regions and without storing data to the one or more recorded regions based on the control information retrieved by said retrieving unit, and said updating unit updates said control information; and
   wherein said information storage apparatus, when said region determining unit determines that no said unrecorded region exists in a range in said recording medium and said size determining unit determines that said quantity of data recorded in said recording medium is less than said predetermined size, obtains said control information, stores data in said unrecorded region using said control information until said quantity of data recorded in said recording medium reaches said predetermined size, and updates said control information by said updating unit.

2. The information storage apparatus as claimed in claim 1, wherein said information storage apparatus, in the case where said region determining unit determines that said unrecorded region exists in said recording medium when said information storage apparatus initializes said recording medium, obtains said control information from said retrieving unit, stores dummy data in said unrecorded region using said control information, and updates said control information by said updating unit.

3. The information storage apparatus as claimed in claim 1, wherein said information storage apparatus, when said region determining unit determines that said unrecorded region exists in a range from the top position of the recorded region, obtains said control information, stores data in said unrecorded region using said control information, and updates said control information by said updating unit.

4. The information storage apparatus as claimed in claim 1,
wherein said information storage apparatus, when said region determining unit determines that no said unrecorded region exists in said recording medium and said size determining unit determines that said quantity of data recorded in said recording medium is equal to or more than said predetermined size, writes said control information in said recording medium.

5. The information storage apparatus as claimed in claim 1, further comprising:
a position obtaining unit that obtains information of last recorded position in said recording medium based on said control information retrieved by said retrieving unit; and
a creating unit that creates new control information based on said information of last recorded position in said recording medium;
wherein said information storage apparatus, when initializing said recording medium, stores data in said unrecorded region based on said new control information created by said creating unit.

6. The information storage apparatus as claimed in claim 1, further comprising:
a region setting unit that sets a region in which defects are examined;
a writing unit that writes data in said region set by said region setting unit; and
an examining unit that examines positions of said defects by reading said data written by said writing unit;
wherein said information storage unit, when said writing unit writes data in said region set by said region setting unit and said examining unit examines said positions of said defects by reading said data written by said writing unit, registers said positions of said defects in said control information.

7. The information storage apparatus as claimed in claim 6, further comprising a recording unit that records data in an examined region;
wherein said information storage apparatus, when examining said defects in said recording medium, examines defects in a region other than said region examined by said examining unit.

8. A method of storing data to certify or format a recording medium, comprising the steps of:
retrieving, from said recording medium, control information indicating one or more recorded regions in which data has been written or indicating one or more unrecorded regions in which data has not been written yet, the recording medium including a reproduction data region, the reproduction data region including the one or more recorded regions and the one or more unrecorded regions;
determining whether the one or more unrecorded regions exist in said recording medium;
certifying or formatting the recording medium, when a determination is made that the one or more unrecorded regions exist in said recording medium, by storing data in said unrecorded region and without storing data to the recorded region based on the control information; updating said control information;
determining, when it is determined that no said unrecorded region exists in a range in said recording medium, whether quantity of data recorded in said recording medium is equal to or more than a predetermined size less than said reproduction data region; and
storing, when it is determined that said quantity of data recorded in said recording medium is less than said predetermined size, data in said unrecorded region above the range until said quantity of data recorded in said recording medium reaches said predetermined size.

9. The method as claimed in claim 8, further comprising the steps of:
retrieving the control information from said recording medium;
determining whether said unrecorded region exists based on said control information;
writing dummy data, when said unrecorded region exists, in said unrecorded region; and
updating said control information concurrently with writing said dummy data.

10. The method as claimed in claim 8, further comprising the steps of:
storing data in said unrecorded region when said unrecorded region exists in a range from a top position of the recorded region; and
updating said control information concurrently with writing the dummy data.

11. The method as claimed in claim 8, further comprising the steps of:
determining, when it is determined that no said unrecorded region exists in said recording medium, whether quantity of data recorded in said recording medium is equal to or more than said predetermined size; and
writing, when it is determined that said quantity of data recorded in said recording medium is equal to or more than said predetermined size, said control information in said recording medium.

12. The method as claimed in claim 8, further comprising:
obtaining information of last recorded position in said recording medium based on said control information;
creating new control information based on the obtained information of last recorded position; and
storing, when initializing said recording medium, data in said unrecorded region based on said new control information.

13. The method as claimed in claim 8, further comprising the steps of:
setting a region in which defects are examined;
writing data in the set region;
examining positions of defects by reading the written data; and
registering, when said defect is found, said position of said defect in said control information.

14. The method as claimed in claim 8, further comprising the steps of:
recording data in the examined region; and
examining, when examining said recording medium, defects in a region other than said region examined.

15. An information storage apparatus storing data in a recording medium, comprising:

an internal memory unit;

a read/write unit; and a main control unit that retrieves, from said recording medium, control information indicating one or more recorded regions in which said read/write unit has written reproduction data or indicating one or more unrecorded regions in which the read/write unit has not written reproduction data yet, the recording medium including a reproduction data region, the reproduction data region including the one or more recorded regions and the one or more unrecorded regions, stores said control information to said internal memory unit, determines whether one or more unrecorded regions exist in said recording medium by analyzing said control information stored in said internal memory unit, certifies or formats the recording medium, when said control unit determines that the one or more unrecorded regions exist in said recording medium, by controlling the read/write unit to write data in the one or more unrecorded regions without writing data in the one or more recorded regions, determines, when said control unit determines that no said unrecorded region exists in a range in said recording medium, whether quantity of data recorded in said recording range is equal to or more than a predetermined size less than said reproduction data region, stores, when said control unit determines that said quantity of data recorded in said range is less than said predetermined size, additional data in said unrecorded region of said recording medium above the range until the quantity of data reaches said predetermined size, and updates, if said read/write unit writes data in said unrecorded region, said control information stored in said internal memory unit so that said control information indicates that said data are written in said unrecorded region.

16. The information storage apparatus as claimed in claim 15, wherein said control unit stores said data in said unrecorded region if said control unit determines that said unrecorded region is located in a range from a top recording position in said recording medium.

17. The information storage apparatus as claimed in claim 15, wherein said control unit further stores, when said control unit determines that said quantity of data recorded in said range is equal to or greater than said predetermined size, said control information stored in said internal memory unit in said recording medium.

18. The information storage apparatus as claimed in claim 15, wherein said control unit obtains information of recorded regions in said recording medium by checking said control information stored in said internal memory unit, creates new control information indicating the obtained information of said recorded regions; and stores, when initializing said recording medium, data in an unrecorded region identified based on said new control information.

19. The information storage apparatus as claimed in claim 15, wherein said control unit selects a region in which defects are examined;

writes data in the selected region by said read/write unit, reproduces said data written in the selected region, examines the selected region by comparing the reproduced data with said data written in the selected region, and registers, when a defective position is found, information indicating said defective position in said control information.

20. The information storage apparatus as claimed in claim 19, wherein said control unit further registers the selected region as a certified region, and examines data recording regions other than the selected region.

21. A computer readable medium containing a computer program that causes a CPU of an information storage apparatus to:

retrieve, from a recording medium, control information indicating one or more recorded regions in which data has been written or indicating one or more unrecorded regions in which data has not been written, the recording medium including a reproduction data region, the reproduction data region including the one or more recorded regions and the one or more unrecorded regions;

determine whether the one or more unrecorded regions exist in said recording medium;

determine whether quantity of data recorded in said recording medium is equal to or more than a predetermined size less than said reproduction data region;

certify or format the recording medium, when a determination is made that the one or more unrecorded regions exist in said recording medium, by storing data in said unrecorded region and without storing data in the recorded region based on the control information; and update said control information, wherein said information storage apparatus, when said CPU determines that no said unrecorded region exists in a range in said recording medium and that said quantity of data recorded in said recording medium is less than said predetermined size, obtains said control information, stores data in said unrecorded region using said control information until said quantity of data recorded in said recording medium reaches said predetermined size, and updates said control information.

22. An information storage unit, comprising:

a CPU;

an internal memory unit that stores control information of a recording medium;

an interface control unit that controls interfacing with an external host computer;

a read/write control unit that controls writing and reading of data on said recording medium; and a computer readable medium as claimed in claim 21.

* * * * *